United States Patent

Coates et al.

[11] Patent Number: 5,813,245
[45] Date of Patent: Sep. 29, 1998

[54] PRESSURE RELIEF CIRCUIT FOR REFRIGERATOR CONTAINED WATER FILTER

[75] Inventors: Donald A. Coates, Worthington; Kenneth E. Morris, Dublin, both of Ohio

[73] Assignee: White Consolidated Industries, Inc., Cleveland, Ohio

[21] Appl. No.: 740,262

[22] Filed: Oct. 25, 1996

[51] Int. Cl.⁶ .............................. F25D 23/12; B67D 5/62; B01D 17/12
[52] U.S. Cl. .............................. 62/338; 62/389; 210/110; 210/134; 210/175
[58] Field of Search .............................. 210/94, 97, 110, 210/134, 135, 175, 184, 232, 257, 257.2, 282; 62/338, 339, 340, 389; 222/146.1, 146.6, 189.06

[56] References Cited

U.S. PATENT DOCUMENTS

| | | | |
|---|---|---|---|
| 4,571,953 | 2/1986 | Caruso | 62/339 |
| 4,853,117 | 8/1989 | Burrows | 210/110 |
| 5,064,097 | 11/1991 | Brog et al. | 222/146.1 |
| 5,254,243 | 10/1993 | Carr et al. | 210/94 |
| 5,502,978 | 4/1996 | Field | 62/389 |
| 5,560,393 | 10/1996 | Clark | 210/257.1 |
| 5,573,142 | 11/1996 | Morellato et al. | 222/146.1 |
| 5,707,518 | 1/1998 | Coates et al. | 62/339 |
| 5,715,699 | 2/1998 | Coates et al. | 62/338 |

Primary Examiner—Joseph W. Drodge
Attorney, Agent, or Firm—Pearne, Gordon, McCoy and Granger LLP

[57] ABSTRACT

A refrigerator having a water filtration and dispensing system including a first control valve for unfiltered water, a household water supply line for fluidly connecting the first control valve to a source of household water, a water filter assembly disposed within a refrigeration compartment, an unfiltered water supply line fluidly connecting the first control valve to the water filter assembly, a second control valve having first and second outlets, a filtered water supply line fluidly connecting the filter assembly to the second control valve, a filtered water dispenser fluidly connected to the first outlet of second control valve, and an ice maker disposed within a freezer compartment and fluidly connected to the second outlet of the second control valve. The system also includes a water dispenser switch for opening the first and second control valves to permit unfiltered water to flow into the water filter assembly and to permit filtered water to flow out of the water dispenser, and an ice maker switch connected for opening the first and second control valves to permit unfiltered water to flow into the water filter assembly and to permit filtered water to flow into the ice maker. A pressure-relief switch connects the water dispenser switch and the first control valve so that the first control valve can be selectively disconnected. With the first control valve disconnected, the water dispenser switch only opens the second control valve to thereby prevent unfiltered water from flowing into the water filter assembly and permit filtered water to flow out of the water dispenser. The system is thereby relieved or bled of water pressure prior to replacing the filter cartridge.

23 Claims, 6 Drawing Sheets

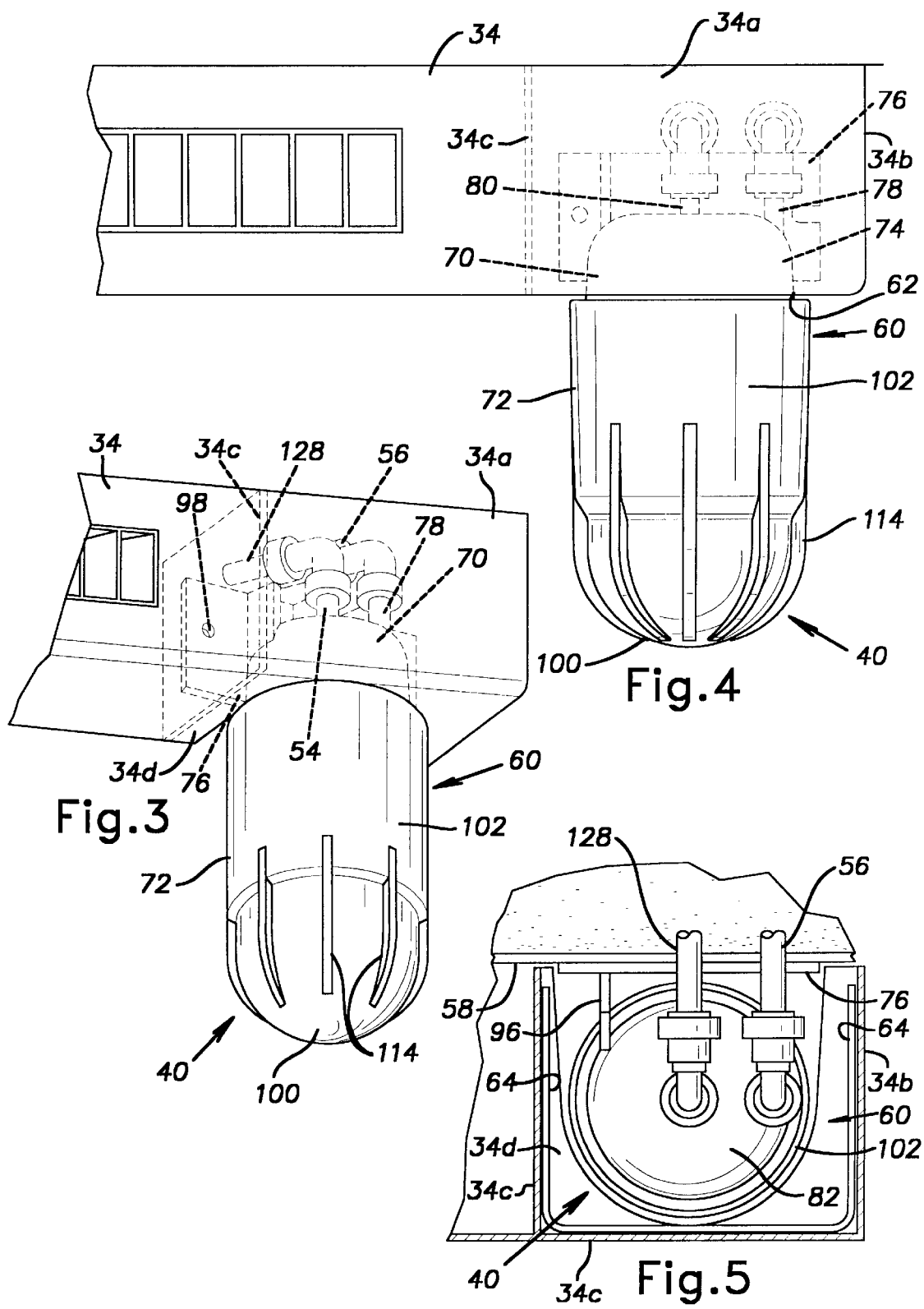

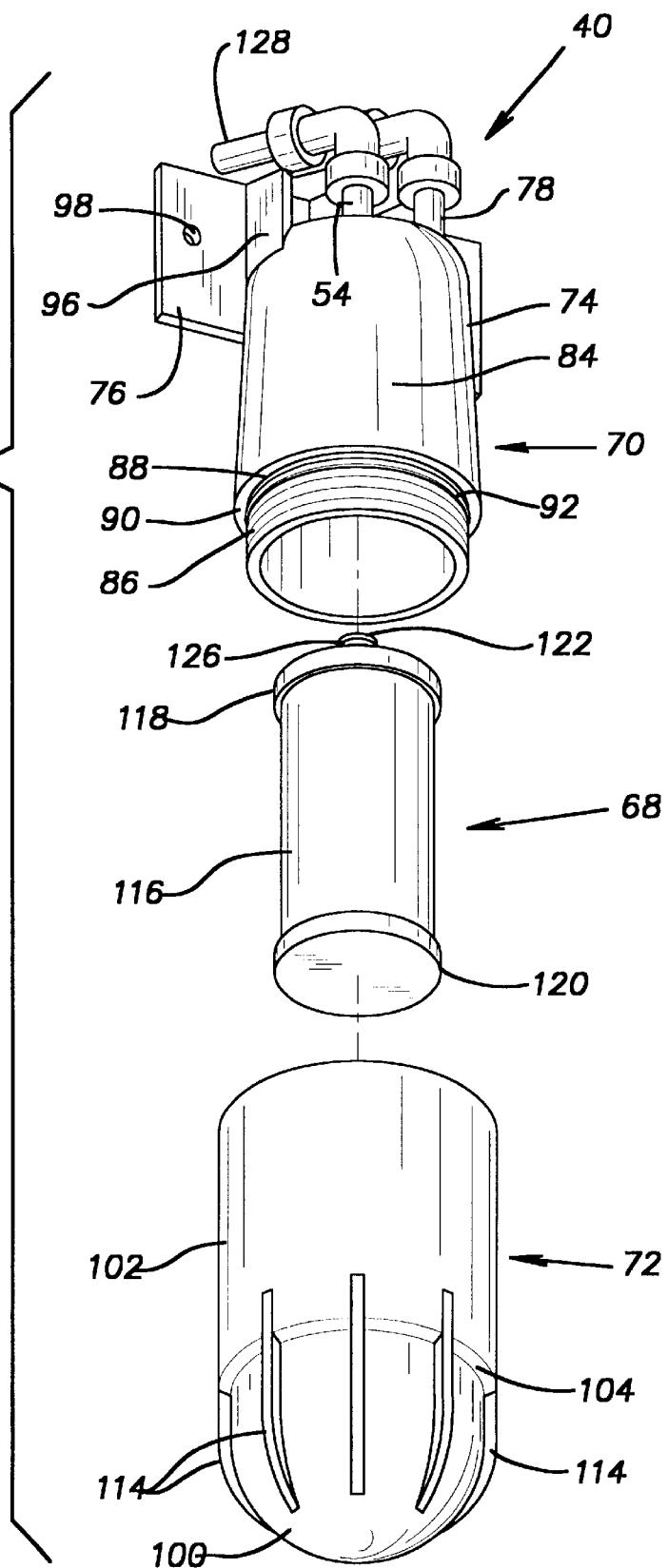

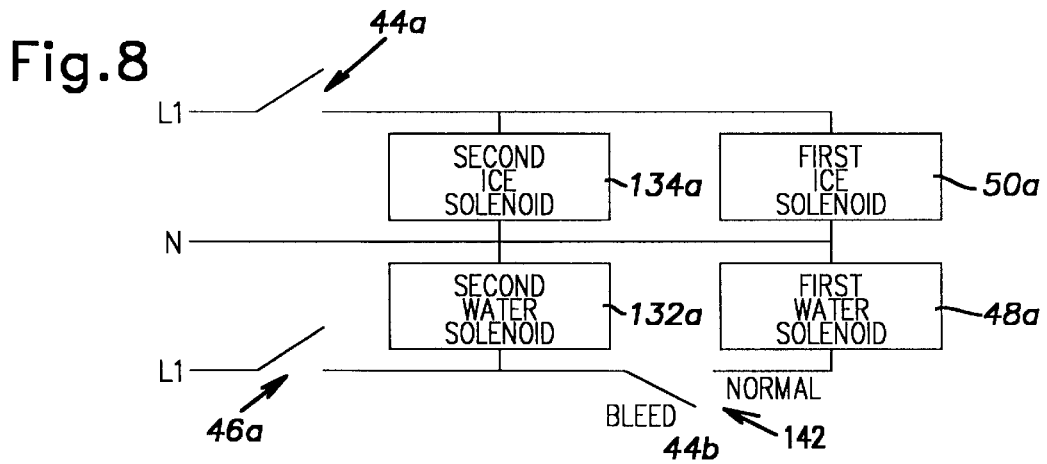
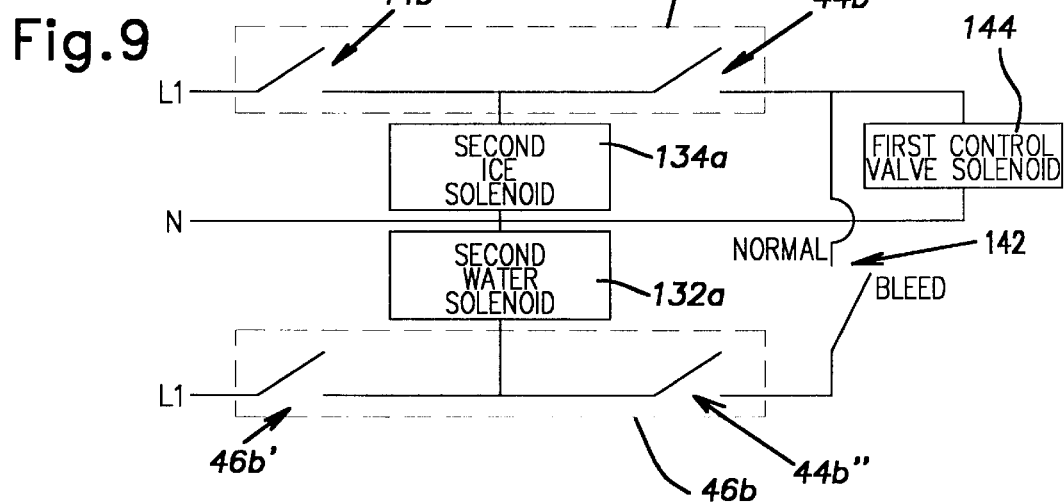
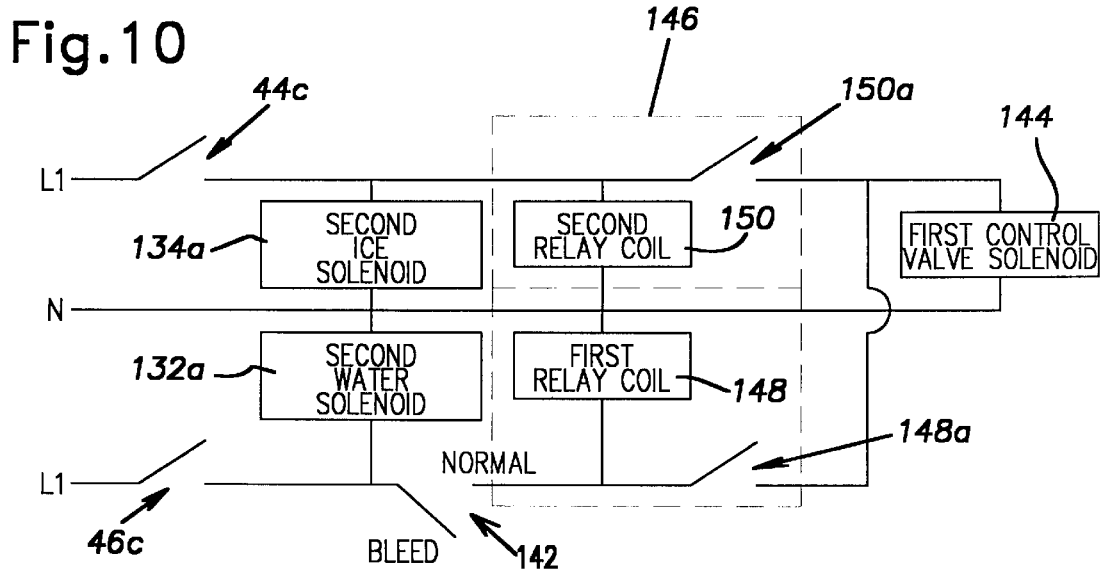

PRESSURE RELIEF CIRCUIT FOR REFRIGERATOR CONTAINED WATER FILTER

BACKGROUND OF THE INVENTION

1. Field of the Invention

The present invention generally relates to water filters for household refrigerators, and more specifically, to such water filters having a pressure relief circuit.

2. Description of the Related Art

In recent years there has been a great increase in the sale and availability of household water filtration devices as the public has begun to realize the benefits derived from drinking highly pure water. Concurrently, refrigerator mounted water dispensers and automatic ice makers have become more affordable and more commonplace. In response to this fact, there have been attempts to incorporate water filters into household refrigerators to provide a filtered water supply for direct dispensing via the refrigerator water dispenser, or for use in making ice cubes via an automatic ice maker.

U.S. Pat. No. 5,135,645 discloses one attempt to incorporate a water filter into a refrigerator. The '645 patent teaches mounting the water filter within a compartment accessible via a door from the inside of the refrigerator compartment. The filter is formed of a replaceable cartridge having a cylindrical body from which inlet and outlet lines extend. In one embodiment, a first pair of valves are disposed outside the refrigerator and couple the water filter to a source of water. A second pair of valves couple the water filter to a water dispenser and an ice maker. A water dispenser switch controls a first one of the first pair of valves and a first one of the second pair of valves to permit flow of water from the source to the water dispenser via the filter. An ice maker switch controls a second one of the first pair of valves and a second one of the second pair of valves to permit flow of water from the source to the ice maker via the filter. Therefore, water does not flow into the refrigerator unless the water dispenser switch or the ice maker dispenser switch is activated. This arrangement may be desirable because conduit carrying water inside the refrigerator is susceptible to freezing which may cause the conduit to break and water to spill out. Because water flows into the refrigerator only when the ice maker or water dispenser are in use, the extent of potential flooding is limited to water remaining within the system. However, the water remaining within the system is pressurized and can cause spills or difficulty in removing the filter for replacement.

U.S. patent application No. 08/587,635, filed on Jan, 17, 1996, now U.S. Pat. No. 5,707,528, discloses a refrigerator having a water filtration and dispensing system. The '635 application teaches mounting a water filter assembly on the wall of the refrigeration compartment. The water filter assembly includes a replaceable cartridge disposed within a separable two-piece housing. Once again, a first pair of valves couple the water filter assembly to a source of water and a second pair of valves couple the water filter assembly to a water dispenser and an ice maker so that water flows into the refrigerator only when the ice maker or water dispenser are in use. The first valves are closed prior to the second valves to reduce the water pressure on the water filter assembly and thereby make disassembly of the filter housing easier by reducing the water-pressure induced tension on the filter assembly. The system required for the delayed closure of the second valves introduce manufacturing costs to the resulting refrigerator which may render it cost prohibitive, except on the most expensive refrigerators.

Despite progress in the art, exemplified by the forgoing patents, there exists a need in the art for a water filtration system for a household refrigerator which includes a cartridge that is easily replaceable and is not cost prohibitive.

SUMMARY OF THE INVENTION

The present invention provides an improved water filtration and dispensing system for a refrigerator which overcomes at least some of the above-noted problems of the related art. The filtration and dispensing system includes a water filter assembly which includes an easily accessed and replaced water cartridge.

In accordance with the present invention, a filtration and dispensing system includes a first control valve for unfiltered water, a household water supply line for fluidly connecting the first control valve to a source of household water, a water filter assembly, an unfiltered water supply line fluidly connecting the first control valve to the water filter assembly, a second control valve for filtered water, a filtered water supply line fluidly connecting the water filter assembly and the second control valve, and a filtered water dispenser fluidly connected to the second control valve. The system also includes a water dispenser switch connected to the first and second control valves for opening the first and second control valves to permit unfiltered water to flow into the water filter assembly and to permit filtered water to flow out of the water dispenser, and a pressure-relief switch connecting the water dispenser switch and the first control valve for selectively disconnecting the first control valve to open the second control valve but not the first control valve in response to the water dispenser switch and to thereby prevent unfiltered water from flowing into the water filter assembly and permit filtered water to flow out of the water dispenser.

BRIEF DESCRIPTION OF THE DRAWINGS

These and further features of the present invention will be apparent with reference to the following description and drawings, wherein:

FIG. 3 is a perspective view of a water filter assembly of the household refrigerator of FIG. 1;

FIG. 4 is a front elevational view of the water filter assembly of FIG. 3;

FIG. 5 is a top elevational view of the water filter assembly of FIG. 4 secured to the refrigerator;

FIG. 6 is an exploded perspective view of the water filter assembly of the refrigerator of FIG. 1;

FIG. 8 is a schematic illustration of a control and pressure relief circuit according to the present invention;

FIG. 9 is a schematic illustration of a first alternative control and pressure relief circuit according to the present invention; and FIG. 10 is a schematic illustration of a second alternative control and pressure relief circuit according to the present invention.

DETAILED DESCRIPTION OF THE PREFERRED EMBODIMENT

Figure 1:
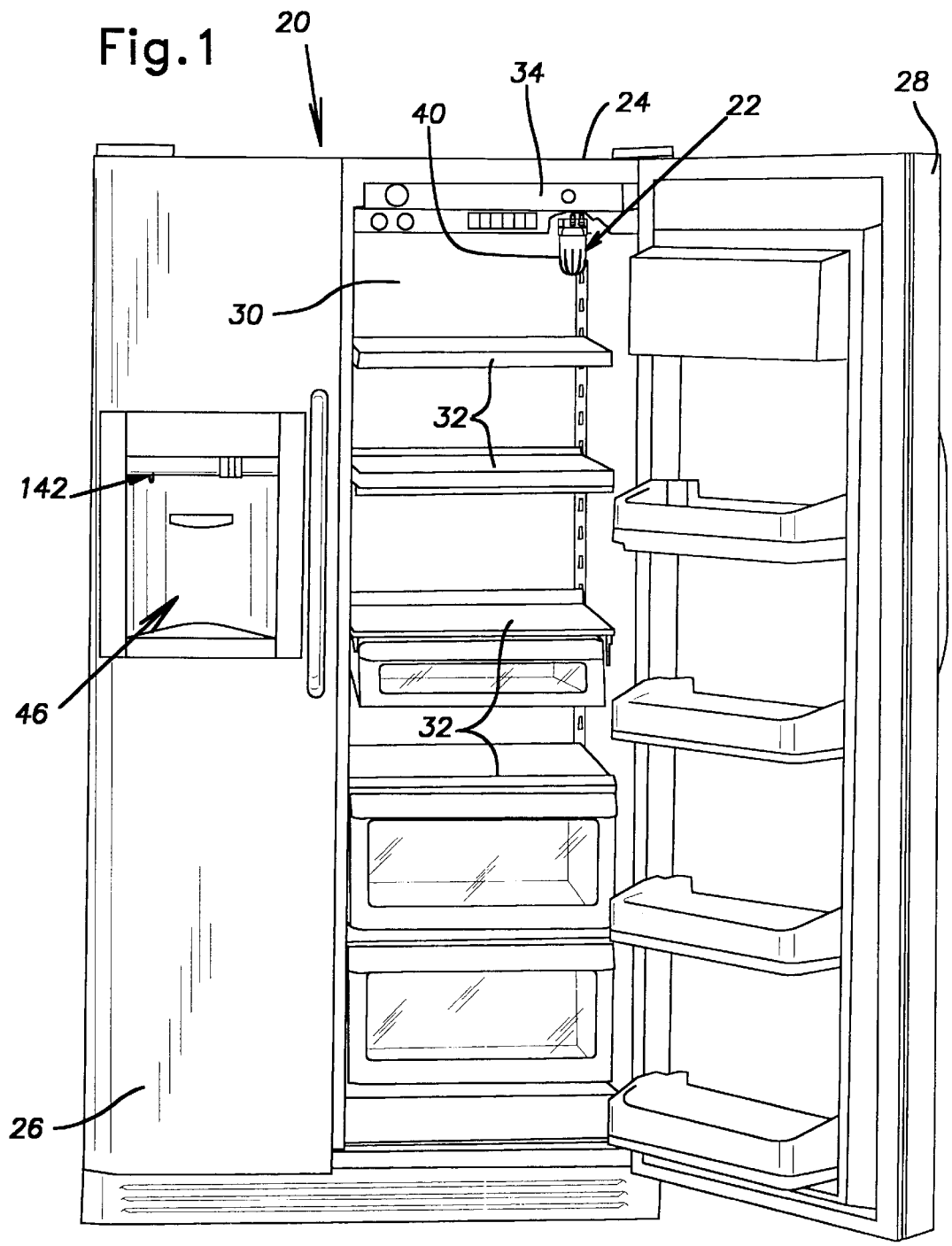
FIG. 1 is a perspective view of a household refrigerator incorporating a water filtering and dispensing system according to the present invention.

FIG. 1 illustrates a refrigerator 20 incorporating a water filtering and dispensing system 22 according to the present invention. The refrigerator includes a cabinet 24 having a plurality of insulated walls and a front opening. A freezer door 26 and a refrigerator door 28 are pivotally mounted to the cabinet 24 to selectively close and open the front opening to provide access into the cabinet 24. The doors 26, 28 cooperate with the cabinet 24 to define a refrigeration compartment 30 and a freezer compartment (not shown) beside the refrigeration compartment 30. The illustrated refrigerator 20 is commonly known in the art as a "side-by-side" refrigerator.

The refrigeration compartment 30 is generally rectangular in configuration, and has a series of shelves 32 mounted therein for storage of foodstuffs. At an upper, rear portion of the refrigeration compartment a shield 34 is provided to which various controls for regulating operating conditions of the refrigerator 20 are mounted.

Figure 2:
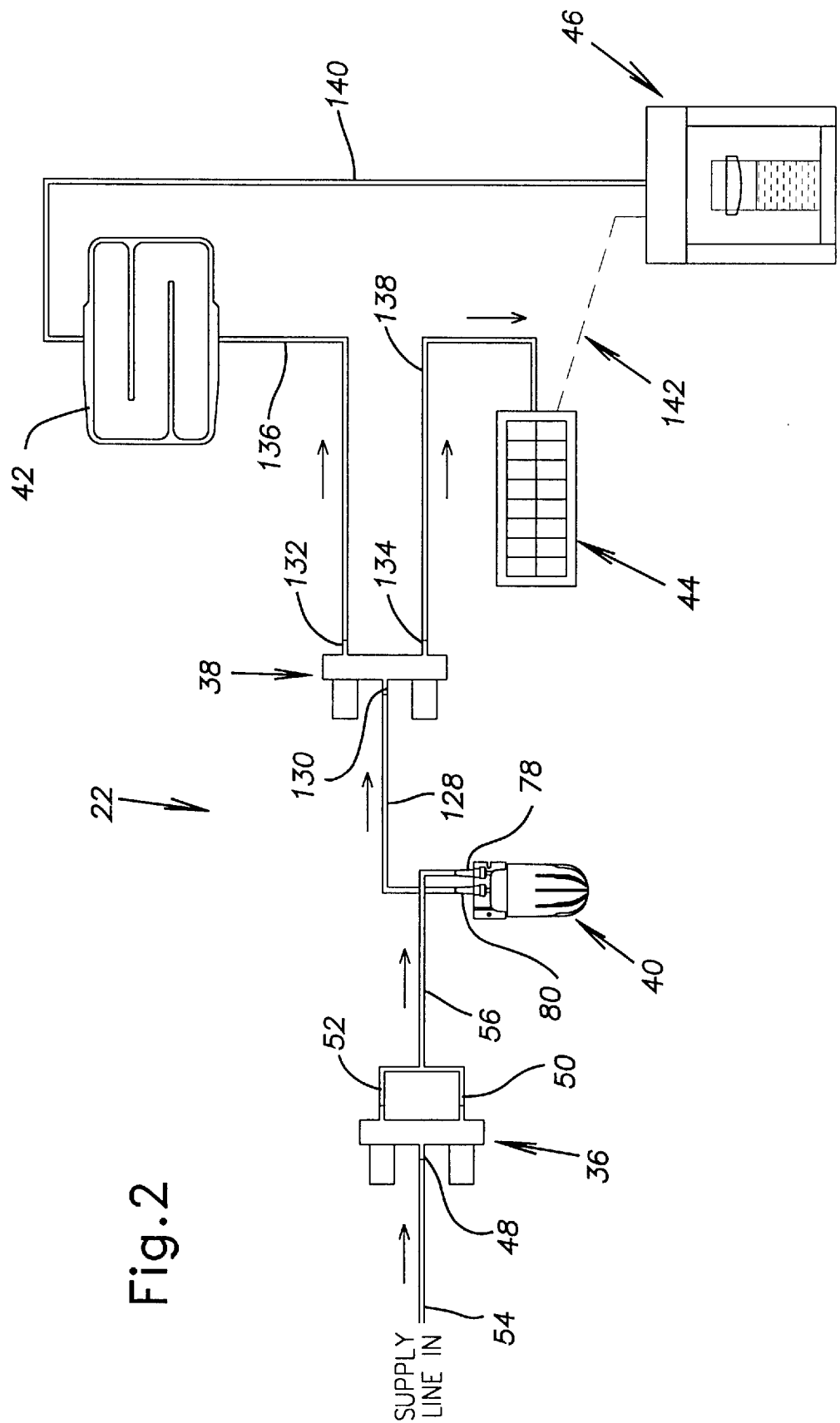
FIG. 2 is a schematic illustration of a water supply circuit for the refrigerator of FIG. 1.
Figure 7:
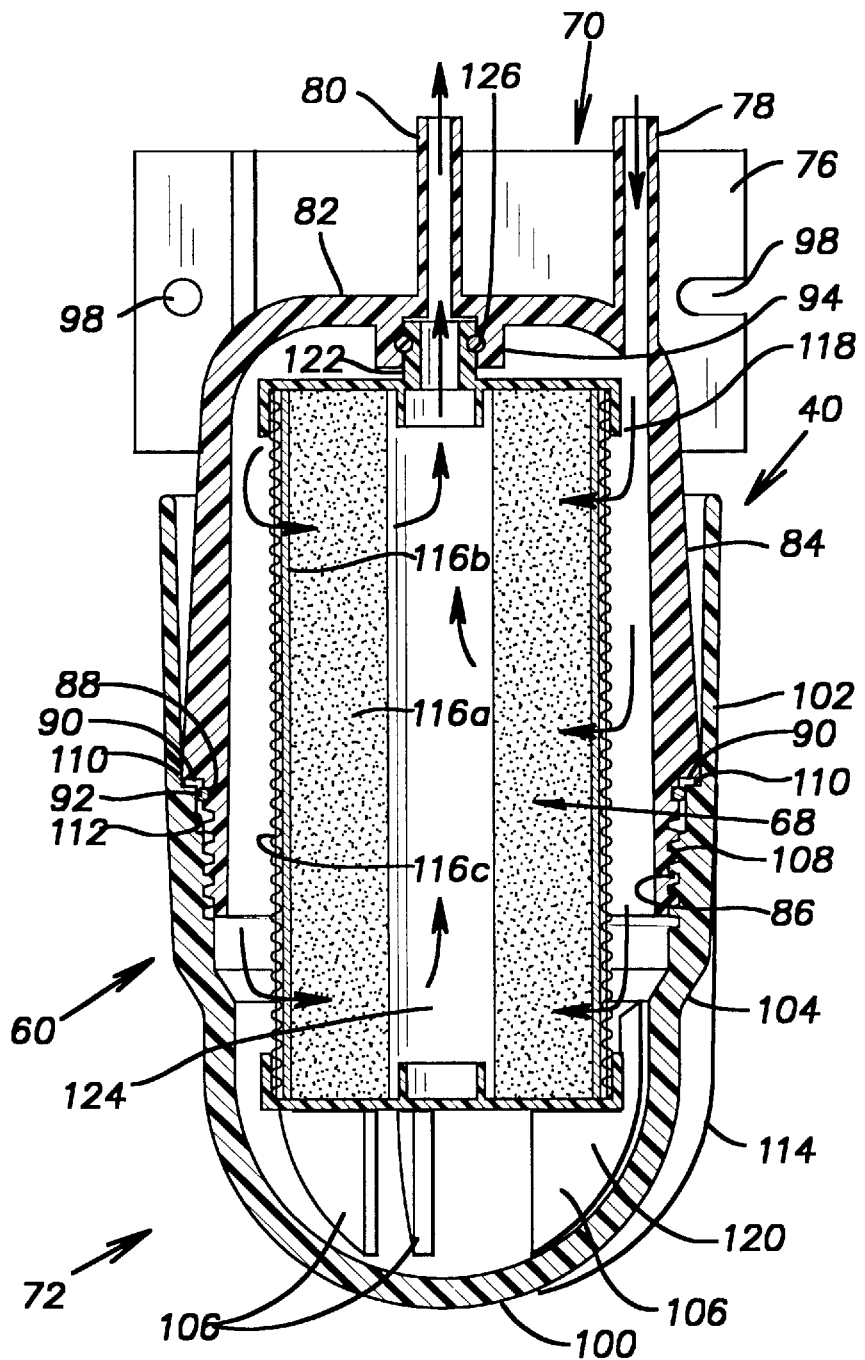
FIG. 7 is a cross-sectional view of the water filter assembly of the refrigerator of FIG. 1.

As schematically shown in FIG. 2, the water filtering and dispensing system 22 includes first and second control valves 36, 38, a water filter assembly 40, a filtered water storage tank 42, an automatic ice maker 44, and a combination ice/water dispenser 46. The first control valve 36 is upstream, in a direction of water flow, from the water filter assembly 40, and controls delivery of unfiltered water to the water filter assembly 40. The first control valve 36 has an inlet 48 and first and second outlets 50, 52 which are opened and closed by solenoids 126a, 127a (FIG. 8) respectively.

The inlet 48 of the first control valve 36 is connected to source of household tap water by a household water supply line 54. The first and second outlets 50, 52 of the first control valve 36 are connected to the water filter assembly 40 via an unfiltered water supply line 56.

As best shown in FIGS. 3–5, the filter assembly 40 is partially concealed and surrounded by the shield 34 as best shown in FIG. 3. The shield 34 includes a front wall 34a, a lateral wall 34b, a partition wall 34c, and a bottom wall 34d which cooperate with a rear wall 58 of the cabinet 24 to define a filter compartment 60 which receives a portion of the filter assembly 40. The unfiltered water supply line 56 lies within the insulated rear wall 58 of the cabinet 24, and extends or projects into the filter compartment 60 a short distance to the filter assembly 40. The bottom wall 34d defines an opening 62 through which the filter assembly 40 downwardly extends.

Due to the location of the water filter assembly 40 at a top rear portion of the refrigeration compartment 30, which tends to be the warmest portion of the refrigeration compartment 30, the water pressure at the water filter assembly 40, and the short lengths of associated water lines exposed within the refrigeration compartment 30, the water within the water filter assembly 40 and associated water lines does not tend to freeze. However, in the illustrated and preferred embodiment, a thin film or strip-type electrical resistance heater 64 is provided to more completely eliminate the risk of freezing.

The electrical resistance heater 64 is secured to inner surfaces of the front, lateral, and partition walls 34a, 34b, 34c, and serves to heat the shield 34, air within the filter compartment 60, the filter assembly 40, and water lines disposed within the filter compartment 60. Thus the heater 64 prevents freezing of water within the filter assembly 40 and associated water lines. The heater 41 is preferably wired to the refrigerator compressor (not shown) so that the heater 41 is activated when the refrigerator compressor is operating to supply cold air to the refrigeration compartment 30. Therefore, the heater 41 operates at the same time cold air is being introduced into the refrigeration compartment 30, and thereby warms the water within the filter assembly 40 and the associated water lines. The heater 41 may, alternatively, be activated automatically on an as needed basis via a thermostat or other controls, may be activated periodically, or may be activated concurrent with other cycles of the refrigerator 20 such as the defrost cycle.

As best shown in FIG. 6, the filter assembly 40 includes a filter housing 66 and a replaceable filter cartridge 68. The filter housing 66 includes a first housing part 70 within the filter compartment 60 and projecting downwardly through the opening 62 in the shield 34 and a second housing part 72 secured to the bottom of the first housing part 70. The first housing part 70 includes a main body 74 from which a mounting bracket 76, an inlet port connector 78, and an outlet port connector 80 integrally extend. The main body 74 of the first housing part is generally cup-shaped having an endwall 82 and a cylindrical sidewall 84 forming an open lower end and a closed upper end.

At the lower end of the main body 74, the sidewall 84 includes a reduced-thickness, externally threaded portion 86, a circumferential groove 88, and a downwardly facing annular surface 90. The circumferential grove 88 is provided with an o-ring 92. The externally threaded portion 86 and the o-ring 92 cooperate with the second housing part 72 to provide a fluid-tight connection between the first housing part 70 and the second housing part 72, as will be described more fully hereafter. The end wall 82 of the main body 74 has a mounting ring 94 projecting downwardly from an inner surface thereof. The mounting ring 94 is coaxial with the central axis of the filter housing 66.

The mounting bracket 76 is integrally connected to the upper end of the main body 74 by a series of connecting webs 96. A pair of apertures 98 are formed in the mounting bracket 76 to facilitate attachment of the bracket 76 to the rear wall 58 of the cabinet 24. The inlet port connector 78 projects from the endwall 82 of the main body 74 and is radially spaced from the central axis of the filter housing 68. The outlet port connector 80 also projects from the endwall 82 of the main body 74 but is generally coaxial with the central axis of the filter housing 66.

The second housing part 72 has a bowl-shaped lower portion 100 and an upstanding cylindrical sidewall portion 102 which are interconnected by a short frustoconical portion 104. The lower portion 100 has a series of ribs 106 formed on an internal surface thereof to aid in locating and supporting the filter cartridge 68. The sidewall portion 102 includes an internally threaded surface 108, an upwardly facing annular surface 110, and an annular sealing surface 112. The threaded surface 108 is received by the externally threaded portion 86 of the first housing part 70. The upwardly facing annular surface 110 is of the second housing part 72 is adjacent the downwardly facing annular surface 90 of the first housing part. The annular sealing surface 112 engages the o-ring 92 of the first housing part 70 to provide a fluid-tight seal therebetween. A series of ribs 114 are formed on the second housing part 72 to enhance gripping of the second housing part 72 by the user, as is necessary for the user to turn the second housing part 72 relative to the first housing part 70 during assembly and disassembly.

The filter cartridge 68 includes a cylindrical filter body 116 and upper and lower end caps 118, 120. The filter body 116 preferably has a multi-material construction, including an inner cylinder of compressed or extruded carbon 116a, an intermediate layer of fiber floss 116b, and an outer mesh wrap 116c. The upper end cap 118 has an outlet connector 122 projecting upwardly therefrom which provides fluid communication between a central bore 124 which longitudinally extends the length of the filter body 116 and the outlet port connector 80 of the first housing part 70. The outlet connector 122 cooperates with the mounting ring 94 of the first housing part 70 to seal the filter cartridge 68 to the first housing part 70 and prevent unfiltered water from bypassing the filter cartridge 68, as will be apparent from the discussion to follow.

The outlet connector 122 is coaxial with the filter body 116 and extends into the mounting ring 94 of the first housing part end wall 82. Preferably, the outlet connector 122 has a circumferential groove which receives an o-ring 126 to seal the upper end cap 118 of the filter cartridge 68 to the first housing part 70, and thereby prevent unfiltered water from bypassing the filter cartridge 68. The lower end cap 120 is engaged and supported by the ribs 106 upwardly extending from the inner surface of the second housing part lower portion 100. The ribs 106 serve to properly position and align the filter cartridge 68 such that the outlet connector 122 is inserted into and held within the mounting ring 94.

During assembly, the first housing part 70 is secured to the rear wall 58 of the cabinet 24, the filter cartridge 68 is inserted into the first housing part 70 such that the outlet connector 122 extends into the mounting ring 94 of the first housing part endwall 82 and the o-ring 126 sealingly engages an inner surface of the mounting ring 94 in a fluid-tight manner. Thereafter, the second housing part 72 is threaded onto the first housing part 70.

As the second housing part 72 is completely threaded onto the first housing part 70, the inner ribs 106 of the second housing part 72 engage the filter cartridge lower end cap 120 to longitudinally and radially support the filter cartridge 68 and force the filter cartridge outlet connecter 122 further into the mounting ring 94. Also, the annular sealing surface 112 of the second housing part 72 is brought into sealing engagement with the o-ring 92 provided by the first housing part 70.

Alternatively, the filter cartridge 68 may be first inserted into the second housing part 72 such that the lower end cap 120 is radially and longitudinally supported by the inner ribs 106 of the second housing part 72. The ribs 106 serve to vertically and radially align the filter cartridge 68 such that, upon subsequent threaded attachment of the first and second housing parts 70, 72, the outlet connector 122 of the filter cartridge 68 is coaxially aligned with, and inserted into, the mounting ring 94 of the first housing part 94, and the o-ring 126 on the outlet connector 122 sealingly engages the inner surface of the mounting ring 94 in a fluid-tight manner.

Unfiltered water from the supply line 56 is introduced through the inlet port connector 78 into the chamber defined by the first and second housing parts 70, 72 radially outward of the filter cartridge 68. The unfiltered water is filtered as it radially inwardly flows through the filter body 116 and into the central bore 124. The filtered water thereafter upwardly flows through the bore 124, through the outlet connector 122, and out the outlet port connector 80.

As best shown in FIG. 2, a filtered water supply line 128 extends from the outlet port connector 80 of the water filter assembly 40 to an inlet 130 of the second control valve 38. Like the unfiltered water supply line 56, the filtered water supply line 128 lies within the insulated rear wall 58 of the cabinet 24, and extends or projects into the filter compartment 60 a short distance (best shown in FIG. 5).

The second control valve 38 has first and second outlets 132, 134 which are opened and closed by solenoids 132a, 134a respectively (FIG. 8). The first outlet 132 is fluidly connected to an inlet of the water storage tank 42 via a first conduit 136, and the second output 134 to the ice maker 44 via a second conduit 138. Preferably, the second outlet 134 of the second control valve 38 includes a "flow washer" to regulate the flow of water into the ice maker 44 to provide a controlled filling thereof, as is known in the art.

An outlet of the water storage tank 42 is connected to the ice/water dispenser 46 by a third conduit 140. The ice maker 44 delivers ice to the ice to the ice/water dispenser 46 via a chute 142 as is known in the art. The ice/water dispenser 46 includes a water dispenser switch 34a. The ice maker 32 includes a switch 32a.

FIG. 8 schematically illustrates a control and pressure relief circuit which includes the solenoids 40a, 50a, 132a, 134a, an ice dispenser switch 44a, a water dispenser switch 46a, and a pressure relief or bleed-off switch 142. The second ice solenoid 134a, which operates the second outlet 134 of the second control valve 38, and the first ice solenoid 50a, which operates the second outlet 50 of the first control valve 36, are connected in parallel such that the first ice solenoid 50a is energized when the second ice solenoid 134a is energized. The ice dispenser switch 44a is provided to selectively provide power to the second ice solenoid 134a in response to a signal from the ice maker 44.

The second water solenoid 132a, which operates the first outlet 132 of the second control valve 38, and the first water solenoid 48a, which operates the first outlet of the first control valve 36, are connected in parallel such that the first water solenoid 48a is energized when the second water solenoid 132a is energized. The water dispenser switch 46a is provided to selectively provide power the second water solenoid 132a in response to actuation of the water dispenser 46.

The bleed-off switch 142 connects the second water solenoid 132a to the first water solenoid 48a allowing the second water solenoid 132a to be selectively energized while the first water solenoid 48a remains open, that is, unenergized. The bleed-off switch 142 is preferably a manually operated toggle switch having a first or normal position and a second or bleed position . When the bleed-off switch 142 is in the normal position, the first water solenoid 48a is energized when the second solenoid is energized 132a. When the bleed-off switch 142 is in the bleed position (as shown in FIG. 8), the first water solenoid 48a is not energized when the second water solenoid 132a is energized. The bleed-off switch 142 is preferably located at the top of the cavity of the water/ice dispenser 46 so that it is conveniently located near the water dispenser actuator (best shown in FIG. 1). Alternatively, the bleed-off switch 142 can be located at the shield 34 within the refrigeration compartment 30 conveniently near the filter assembly 40.

During operation, the bleed-off switch 142 is set to the normal position. When the ice/water dispenser 46 is actuated to dispense water, the water dispenser switch 46a is closed which in turn, provides power to the first water solenoid 48a and to the second water solenoid 132a. The energized solenoids 48a and 132a open the first outlet 48 of the first control valve 36 and the first outlet 132 of the second control valve 38, respectively. Opening the first outlets 48, 132 permits the flow of unfiltered water into the filter assembly 40 and the flow of filtered water into the cold water storage tank 42 and out of the ice/water dispenser 46.

Similarly, when the automatic ice maker 44 needs water to make more ice, the ice maker switch 44a is closed which, in turn, provides power to the first ice solenoid 50a and to the second ice solenoid 134a. The energized solenoids 50a and 134a open the second outlet 50 of the first control valve 36 and the second outlet 134 of the second control valve 38, respectively. Opening the second outlets 50, 134 permits the flow of unfiltered water into the filter assembly 40 and the flow of filtered water into the ice maker 44.

To replace the filter cartridge 68, the bleed-off switch 142 is set to the bleed position (as shown in FIG. 8) and the ice/water dispenser 46 is actuated to dispense water. The ice/water dispenser 46 closes the water dispenser switch 46a which in turn, provide power to the second water solenoid 132a. The second water solenoid 132a opens the first outlet 132 of the second control valve 38 and permits the flow of filtered water from the filter assembly 40 into the cold water storage tank 42 and out of the ice/water dispenser 46. Because the bleed-off switch 142 is in the bleed position, however, the first water solenoid 48a is not energized to open the first outlet 48 of the first control valve 36 so that unfiltered water does not flow into the filter assembly 40. Thus, water located between the control valves, and any pressure created thereby, is bled off through the second control valve 38.

As should be apparent from the foregoing, access to the filter cartridge for replacement is gained by simply twisting or turning the second housing part 72 to unthread the second housing part 72 off the first housing part 70. The reduced pressure in the line resulting from bleeding off water trapped between the control valves 36, 38, reduces the friction between the threads of the first and second housing parts 70, 72 making it easier to remove the second housing part 72. The second housing part 72 defines a receptacle of sufficient size to receive the filter cartridge 68, any water remaining in the filter assembly 40, as well as any water remaining in the unfiltered water supply line 56 and the filtered water supply line 128. Thus leakage or spillage of water into the refrigeration compartment 30 during filter cartridge replacement is eliminated or minimized. Once the spent filter cartridge 68 is removed, a new filter cartridge 68 is installed in the manner described hereinbefore and the bleed-off switch 142 is reset to the normal position.

A first alternative control and pressure relief circuit is shown in FIG. 9, which is adapted for use with an alternative first control valve (not shown). The alternative first control valve differs from the previously described first control valve 36 in that it has only a single outlet controlled by a single solenoid 144. The first alternative circuit includes a double-throw ice maker switch 44b having first and second contacts 44b', 44b" and a double-throw water dispenser switch 46b having first and second contacts 46b', 46b", in addition to the alternative first control valve solenoid 144, the second water and ice solenoids 132a, 134a, and the bleed-off switch 142.

Closing the water dispenser switch 46b closes the first and second contacts 46b', 46b" and provides power to the second water solenoid 132a and to the alternative first control valve solenoid 144 when the bleed-off switch 142 is in the normal position. The solenoids 132a, 144 thereby open the first outlet 132 of the second control valve 38 and the outlet of the alternative first control valve to permit the flow of water as described above to dispense water. When the bleed off-switch 142 is in the bleed position, closing the water dispenser switch 46b closes the first and second contacts 46b', 46b" and provides power only to the second water solenoid 132a and thereby open only the first outlet 132 of the second control valve 38 to permit the flow of water as described above to bleed the filter assembly 40.

Similarly, closing the ice maker switch 44b closes the first and second contacts 44b', 44b" and provides power to the second ice solenoid 134a and to the alternative first control valve solenoid 144. The solenoids 134a, 144 thereby open the second outlet 134 of the second control valve 38 and the outlet of the alternative first control valve to permit the flow of water as described above to supply the ice maker 44 with water.

A second alternative control and pressure relief circuit is shown in FIG. 10. The second alternative circuit includes a single-throw ice maker switch 44c, a single-throw water dispenser switch 46c, and a relay 146, in addition to the alternative first control valve solenoid 144, the second water and ice solenoids 132a, 134a, and the bleed-off switch 142. The relay 146 has a first relay coil 148 controlling a first relay contact 148a and a second relay coil 150 controlling a second relay contact 150a. The bleed-off switch 142 preferably connects the second water solenoid 132a to the first relay coil 148 but alternatively can connect the first relay coil 148 to the alternative first control valve solenoid 144.

When the water dispenser switch 46c is closed, the second water solenoid 132a is energized to open the first outlet 132 of the second control valve 38. When the bleed-off switch 142 is in the normal position, the first relay coil 148 is energized to close the first contact 148a and supply power to the alternative first control valve solenoid 144, thus permitting the flow of water as described above to dispense water. When the bleed-off switch 142 is in the bleed position, the first relay coil 148 is not energized and power is not supplied to the alternative first control valve solenoid 144, thus permitting the flow of water as described above to bleed the filter assembly 40.

Similarly, closing the ice maker switch 44c provides power to the second ice solenoid 134a and opens the second outlet 134 of the second control valve 38. The second relay coil 150 is energized to close the second contact 150a and supply power to the alternative first control valve solenoid 144 and thereby open the outlet of the alternative first control valve to permit the flow of water as described above to supply the ice maker 44 with water.

While the preferred embodiment of the present invention is shown and described in detail herein, it is apparent that numerous modifications, rearrangements, alterations, and substitutions of parts may be resorted to without departing from the scope and spirit of the claims appended hereto. For example, it is contemplated that the parts of the first and second parts 70, 72 of filter housing 66 can be removably secured together by other suitable methods such as, for example, a clamp or a latch.

It is also contemplated, though not preferred due to spacial constraints within the refrigeration compartment 30, that the second housing part 72 could be attached to the cabinet 24 and the first housing part 70 removably secured to the second housing part 72 to more completely eliminate the chance for spillage of water during filter cartridge 68 replacement.

Naturally, it is contemplated that the water filtering and dispensing system 22 of the present invention is useful in other types of refrigerators such as, for example, ones wherein the freezer and refrigeration compartments are vertically offset relative to one another. Additionally, refrigerators that do not include an automatic ice maker, and refrigerators wherein the ice and/or water dispenser is not accessible from the exterior of the refrigerator. Therefore, the scope of the present invention is not limited solely to the preferred embodiment shown and described herein but includes numerous other devices that fall within the meaning of the following claims.

What is claimed is:

1. A water filtration and dispensing system for a refrigerator, said filtration and dispensing system comprising:
   a first control valve for unfiltered water;
   a first water supply line for fluidly connecting said first control valve to a source of household water;
   a water filter assembly;
   a second water supply line fluidly connecting said first control valve and said water filter assembly;
   a second control valve for filtered water;
   a third water supply line fluidly connecting said water filter assembly and said second control valve;
   a filtered water dispenser fluidly connected to said second control valve;
   a water dispenser switch connected to said first and second control valves; and
   a pressure-relief switch connecting said water dispenser switch and said first control valve and having closed and open positions, whereby actuation of said water dispenser switch opens said first and second control valves when said pressure-relief switch is in said closed position to permit unfiltered water to flow into said water filter assembly and to permit filtered water to flow out of said water dispenser, and whereby actuation of said water dispenser switch opens said second control valve but not said first control valve when said pressure-relief switch is in said open position to prevent unfiltered water from flowing into said water filter assembly and permit filtered water to flow out of said water dispenser.

2. The water filtration and dispensing system according to claim 1, wherein said pressure-relief switch is located at said water dispenser.

3. The water filtration and dispensing system according to claim 1, wherein said first and second control valves each include a solenoid.

4. The water filtration and dispensing system according to claim 3, wherein closing said water dispenser switch, with said pressure-relief switch in said closed position, energizes said solenoid of said first control valve and said solenoid of said second control valve to open said first and second control valves, and closing said water dispenser switch, with said pressure-relief switch in said open position, energizes said solenoid of said second control valve but not said solenoid of said first control valve to open said second control valve but not said first control valve.

5. The water filtration and dispensing system according to claim 3, wherein said solenoids of said first and second control valves are electrically connected in parallel, and wherein said pressure-relief switch electrically connects said solenoid of said first control valve and said solenoid of said second control valve.

6. The water filtration and dispensing system according to claim 1, wherein said pressure-relief switch is manually actuatable between said closed and open positions.

7. A water filtration and dispensing system for a refrigerator, said filtration and dispensing system comprising:
   a first control valve for unfiltered water;
   a first water supply line for fluidly connecting said first control valve to a source of household water;
   a water filter assembly having an inlet and an outlet;
   a second water supply line fluidly connecting said first control valve to said inlet of said water filter assembly;
   a second control valve having an inlet and first and second outlets;
   a third water supply line fluidly connecting said outlet of said water filter assembly to said inlet of said second control valve;
   a filtered water dispenser fluidly connected to said first outlet of second control valve;
   an ice maker fluidly connected to said second outlet of said second control valve;
   a water dispenser switch connected to said first and second control valves;
   an ice maker switch connected to said first and second control valves for opening said first control valve and said second outlet of said second control valve to permit unfiltered water to flow into said water filter assembly and to permit filtered water to flow into said ice maker; and
   a pressure-relief switch connecting said water dispenser switch and said first control valve and having closed and open positions, whereby actuation of said water dispenser switch opens said first and second control valves when said pressure-relief switch is in said closed position to permit unfiltered water to flow into said water filter assembly and to permit filtered water to flow out of said water dispenser, and whereby actuation of said water dispenser switch opens said second control valve but not said first control valve when said pressure-relief switch is in said open position to prevent unfiltered water from flowing into said water filter assembly and permit filtered water to flow out of said water dispenser.

8. The water filtration and dispensing system according to claim 7, wherein said pressure-relief switch is located at said water dispenser.

9. The filtration and dispensing system according to claim 7, wherein said first control valve has an inlet and first and second outlets, and wherein said first and second control valves each include first and second solenoids which respectively control opening of said first and second outlets of said first and second control valves.

10. The water filtration and dispensing system according to claim 9, wherein said first solenoids of said first and second control valves are electrically connected in parallel, and wherein said pressure-relief switch electrically connects said first solenoid of said first control valve and said first solenoid of said second control valve.

11. The filtration and dispensing system according to claim 9, wherein closing said water dispenser switch, with said pressure-relief switch in said closed position, energizes said first solenoid of said first control valve and said first solenoid of said second control valve to open said first outlets of said first and second control valves, and closing said water dispenser switch, with said pressure-relief switch in said open position, energizes said first solenoid of said second control valve but not said first solenoid of said first control valve to open said first outlet of said second control valve but not said first outlet of said first control valve.

12. The water filtration and dispensing system according to claim 7, wherein said first control valve has an outlet which is opened and closed by a solenoid and said second control valve has first and second solenoids which respectively control opening of said first and second outlets of said second control valve.

13. The water filtration and dispensing system according to claim 12, wherein said water dispenser and ice maker switches are double-throw switches, wherein closing said water dispenser switch, with said pressure-relief switch in said closed position, energizes said first control valve solenoid and said first solenoid of said second control valve to open said outlet of said first control valve and said first outlet of said second control valve, wherein closing said water dispenser switch, with said pressure-relief switch in said open position, energizes only said first solenoid of said second control valve to open said first outlet of said second control valve, and wherein closing said ice maker switch energizes said first control valve solenoid and said second solenoid of said second control valve to open said outlet of said first control valve and said second outlet of said second control valve.

14. The filtration and dispensing system according to claim 12, wherein said pressure-relief switch electrically connects said water dispensing switch and said first control valve solenoid.

15. The water filtration and dispensing system according to claim 12, further comprising a relay having a first coil electrically connected in parallel with said first solenoid of said second solenoid and a second coil electrically connected in parallel with said second solenoid of said second control valve, and wherein said first coil is operable to energize said solenoid of said first control valve upon closing of said water dispenser switch and the second coil is operable to energize said solenoid of said first control valve upon closing of the ice maker switch.

16. The filtration and dispensing system according to claim 15, wherein said pressure-relief switch electrically connects said first solenoid of said second control valve and said first coil of said relay.

17. The water filtration and dispensing system according to claim 7, wherein said pressure-relief switch is manually actuatable between said closed and open positions.

18. A refrigerator comprising:
 a cabinet having a plurality of insulated walls;
 a refrigerator door pivotally mounted to said cabinet and cooperating to form a refrigeration compartment;
 a freezer door pivotally mounted to said cabinet and cooperating to form a freezer compartment; and
 a filtration and dispensing system including, a first control valve for unfiltered water, a first water supply line for fluidly connecting said first control valve to a source of household water, a water filter assembly disposed within said refrigeration compartment and having an inlet and an outlet, a second water supply line fluidly connecting said first control valve to said inlet of said water filter assembly, a second control valve having an inlet and first and second outlets, a third water supply line fluidly connecting said outlet of said water filter assembly to said inlet of said second control valve, a filtered water dispenser fluidly connected to said first outlet of second control valve, an ice maker disposed within said freezer compartment and fluidly connected to said second outlet of said second control valve, a water dispenser switch connected to said first and second control valves, an ice maker switch connected to said first and second control valves for opening said first control valve and said second outlet of said second control valve to permit unfiltered water to flow into said water filter assembly and to permit filtered water to flow into said ice maker, and a pressure-relief switch connecting said water dispenser switch and said first control valve and having closed and open positions, whereby actuation of said water dispenser switch opens said first and second control valves when said pressure-relief switch is in said closed position to permit unfiltered water to flow into said water filter assembly and to permit filtered water to flow out of said water dispenser, and whereby actuation of said water dispenser switch opens said second control valve but not said first control valve when said pressure-relief switch is in said open position to prevent unfiltered water from flowing into said water filter assembly and permit filtered water to flow out of said water dispenser.

19. The refrigerator according to claim 18, wherein said pressure-relief switch is located at said water dispenser.

20. The refrigerator according to claim 19, wherein said water dispenser is located in said freezer door.

21. The refrigerator according to claim 18, wherein said first control valve has an inlet and first and second outlets, and wherein said first and second control valves each include first and second solenoids which respectively control opening of said first and second outlets of said first and second control valves.

22. The refrigerator according to claim 21, wherein said first solenoids of said first and second control valves are electrically connected in parallel, and wherein said pressure-relief switch electrically connects said first solenoid of said first control valve and said first solenoid of said second control valve.

23. The refrigerator according to claim 18, wherein said pressure-relief switch is manually actuatable between said closed and open positions.

\* \* \* \* \*

UNITED STATES PATENT AND TRADEMARK OFFICE
CERTIFICATE OF CORRECTION

PATENT NO. : 5,813,245
DATED : September 29, 1998
INVENTOR(S) : Coates et al.

It is certified that error appears in the above-indentified patent and that said Letters Patent is hereby corrected as shown below:

On the title page, References Cited, U.S. PATENT DOCUMENTS, insert

```
        --3,982,406    9/1976    Hanson et al.
          5,083,442    1/1992    Vlock
          5,135,645    8/1992    Sklenak et al.--.
```

Column 1, line 49, delete "Jan," and insert --Jan.--.

Column 3, line 28, before "source" insert --a--.

Signed and Sealed this

Sixth Day of April, 1999

Attest:

Attesting Officer

Q. TODD DICKINSON
Acting Commissioner of Patents and Trademarks